United States Patent [19]

Yamaguchi et al.

[11] Patent Number: 4,739,316

[45] Date of Patent: Apr. 19, 1988

[54] STRUCTURE OF PORTABLE ELECTRONIC APPARATUS

[75] Inventors: Shigeru Yamaguchi; Masanori Matsuishi, both of Nara; Tetsuo Nishihara, Osaka, all of Japan

[73] Assignee: Sharp Kabushiki Kaisha, Osaka, Japan

[21] Appl. No.: 601,486

[22] Filed: Apr. 18, 1984

[30] Foreign Application Priority Data

Apr. 26, 1983 [JP] Japan .................. 58-64562[U]

[51] Int. Cl.⁴ .................................. G09G 3/02
[52] U.S. Cl. .................. 340/711; 340/365 R; 312/208
[58] Field of Search .......... 340/365 R, 711; 358/903, 254; 312/7, 2, 208, 326–327; 400/556.1, 557, 560, 568

[56] References Cited

U.S. PATENT DOCUMENTS

| | | | |
|---|---|---|---|
| 694,602 | 3/1902 | Barron | 400/557 |
| 1,021,970 | 4/1912 | Corcoran | 400/556.1 |
| 3,880,016 | 4/1975 | Jamieson et al. | 400/568 |
| 4,181,966 | 1/1980 | Wenninger et al. | 340/365 VL |
| 4,257,179 | 3/1981 | Oka et al. | 340/365 VL |
| 4,258,387 | 3/1981 | Lemelson et al. | 358/254 |
| 4,294,496 | 10/1981 | Murez | 312/208 |
| 4,485,400 | 11/1984 | Lemelson et al. | 358/254 |

Primary Examiner—John W. Caldwell, Sr.
Assistant Examiner—Tyrone Queen
Attorney, Agent, or Firm—Birch, Stewart, Kolasch & Birch

[57] ABSTRACT

An electronic apparatus such as a compact computer, a compact information processor, and a compact word processor comprises a pivotal cover carrying a display. The pivotal cover is closed on a keyboard of the electronic apparatus. The display is secured on a surface of the pivotal cover facing a surface of the keyboard during the closing. The pivotal cover is opened to uprise the display with an inclination angle to operate the display. The inclination angle of the pivotal cover can be controlled with a help of gears and dampers provided in two legs of the pivotal cover.

6 Claims, 3 Drawing Sheets

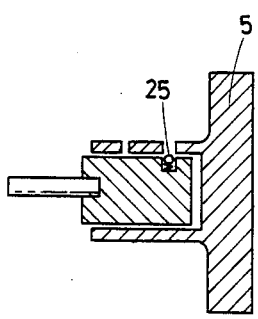
FIG. 2
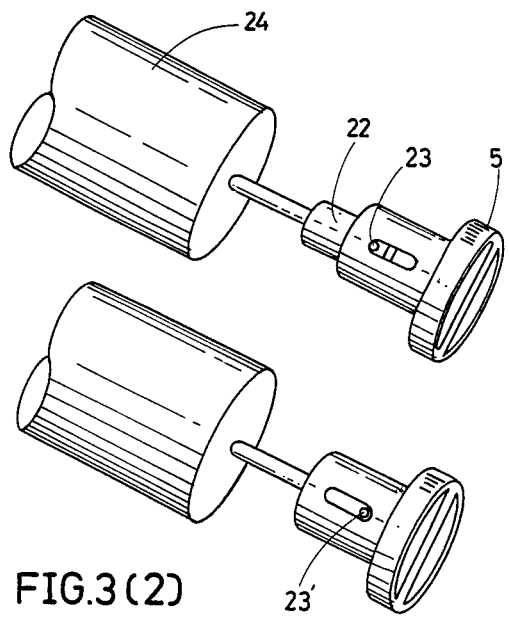
FIG. 3(1)
FIG. 3(2)
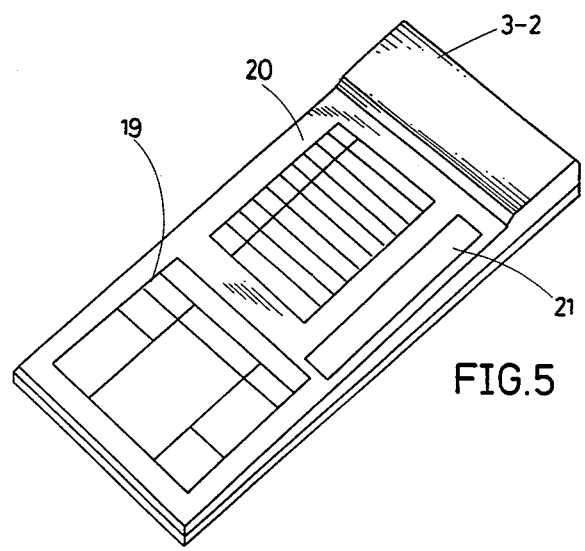
FIG. 5

STRUCTURE OF PORTABLE ELECTRONIC APPARATUS

BACKGROUND OF THE INVENTION

The present invention relates to an electronic apparatus and, more particularly, to a structure of a portable electronic apparatus such as a compact information processor, a compact computer and a compact word processor equipped with a display, a keyboard, and a cover for the keyboard.

To make the electronic apparatus compact, conventionally, a keyboard or a display per se may be made compact or the arrangement of the keyboard and the display may be devised. However, the compactness of the keyboard and the display leads to the problems that the size of and the space between the key tops is made small and the display panel is made small. This causes the key operability and the display visibility to be reduced, disadvantageously.

SUMMARY OF THE INVENTION

Accordingly, it is an object of the present invention to provide an improved structure of an electronic apparatus equipped with a keyboard and a display.

It is another object of the present invention to provide an improved structure of a compact electronic apparatus equipped with a pivotal cover, a keyboard, and a display.

It is a further object of the present invention to provide an improved structure of a portable information processor eqipped with a pivotal cover, a keyboard, and a display.

Other objects and further scope of applicability of the present invention will become apparent from the detailed description given hereinafter. It should be understood, however, that the detailed description of and specific examples, while indicating preferred embodiments of the invention, are given by way of illustration only, since various changes and modifications within the spirit and scope of the invention will become apparent to those skilled in the art from this detailed description.

According to a preferred embodiment of the present invention, an electronic apparatus such as a compact computer, a compact information processor, and a compact word processor comprises a pivotal cover means carrying a display. The pivotal cover means is closed for covering a keyboard of the electronic apparatus. The display is secured on a surface of the pivotal cover means facing a surface of the keyboard during the closing. The pivotal cover means is opened to uprise the display with an inclination angle to operate the display. The inclination angle of the pivotal cover means can be controlled with a help of gears and dampers provided in two legs of the pivotal cover means.

BRIEF DESCRIPTION OF THE DRAWINGS

The present invention will be better understood from the detailed description given hereinbelow and the accompanying drawings which are given by way of illustration only, and thus are not limitative of the present invention and wherein:

FIG. 2 is a cross-sectional view of a paper feed handle;

FIGS. 3(1) and 3(2) are perspective views of the paper feed handle, showing the operation of the handle;

FIG. 5 is a perspective view of another attachment to the electronic apparatus.

DETAILED DESCRIPTION OF THE INVENTION

First of all, the gist of the present invention can be applied to any apparatus inasmuch as the apparatus is equipped with a keyboard and a display. In the description as stated herein, the apparatus is a portable information processor. It may be evident that the information processor is replaced by any other apparatus such as a computer and a word processor.

Figure 1:
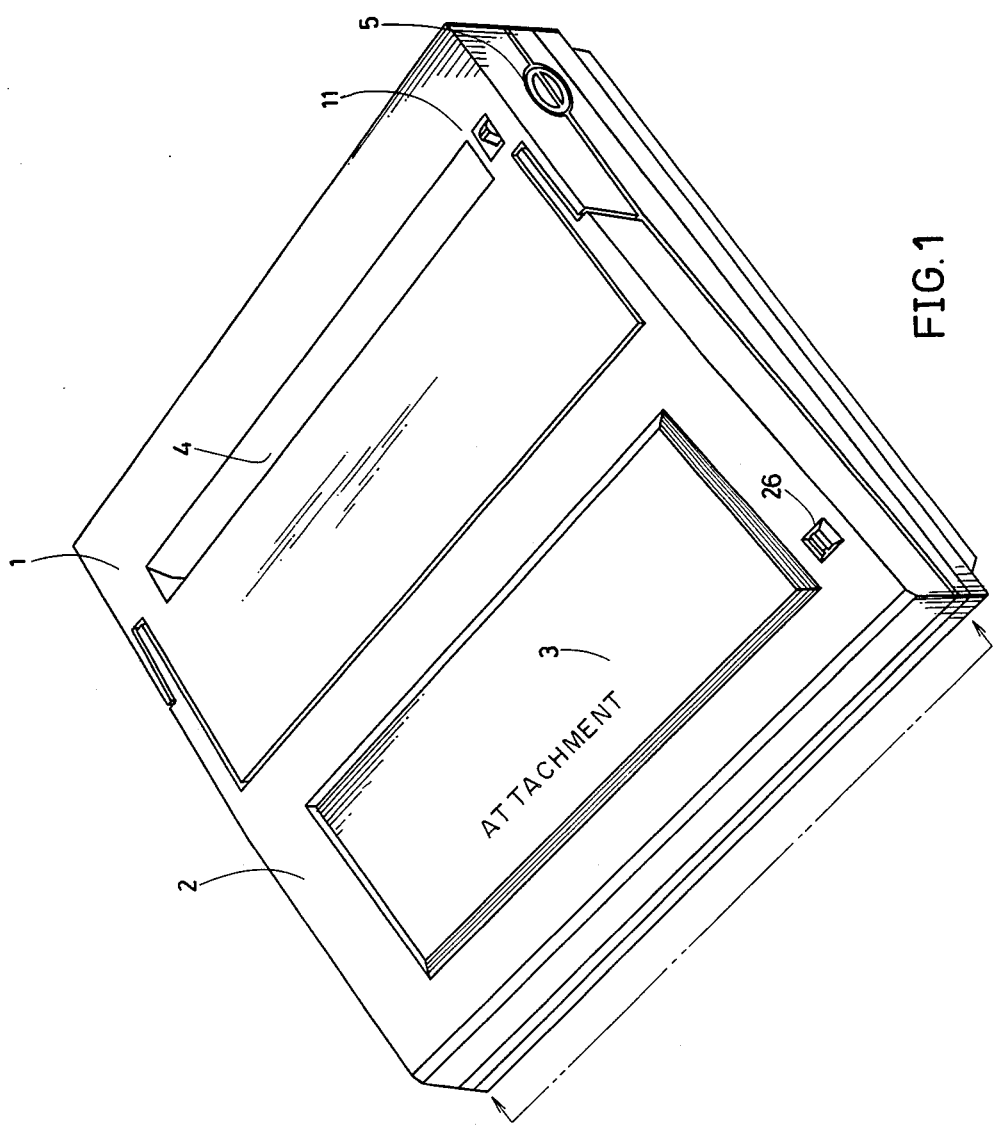
FIG. 1 is a perspective view of an electronic apparatus according to the present invention.
Figure 4:
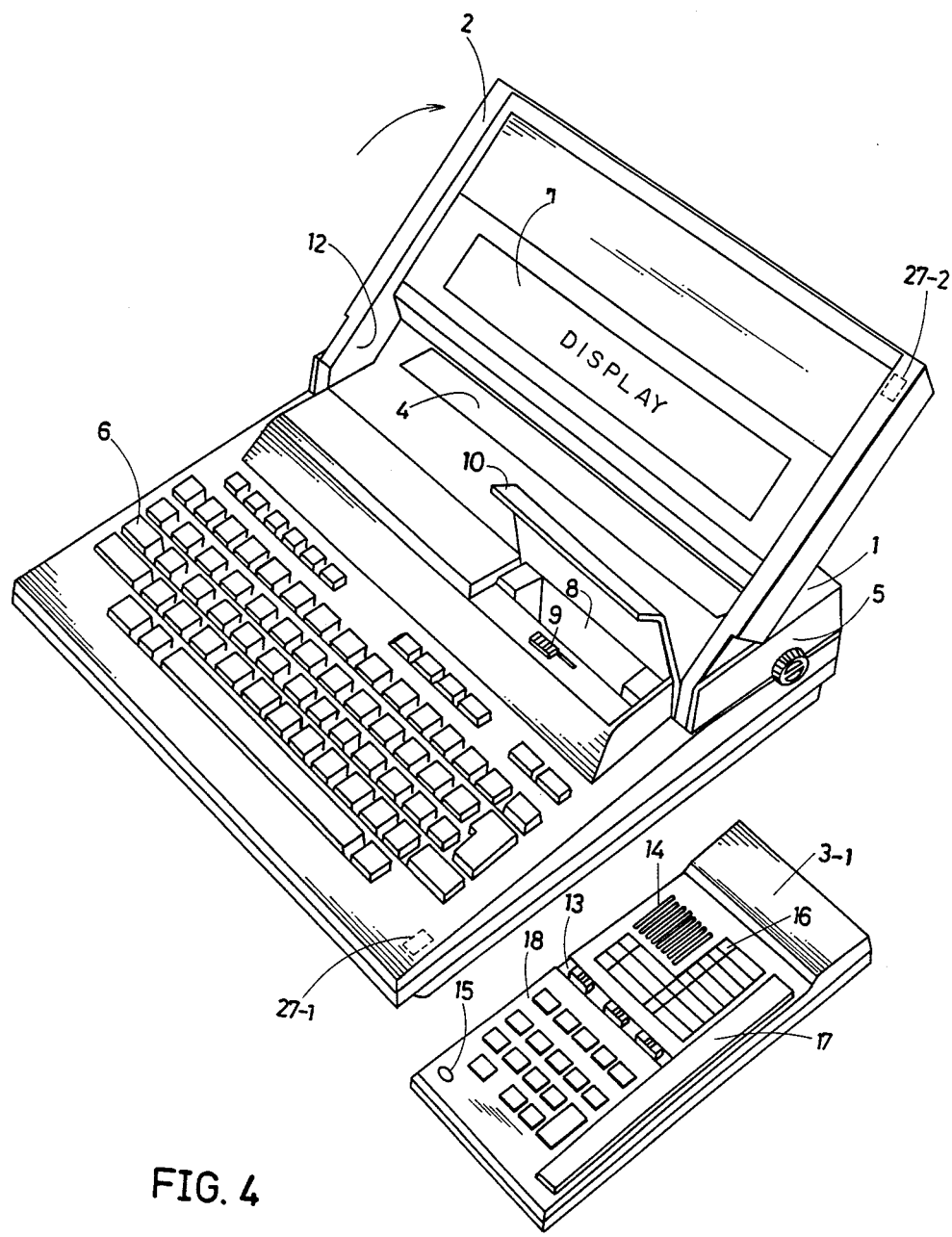
FIG. 4 is a perspective view of the electronic apparatus and an attachment, showing a condition of the apparatus with its cover opened.

FIG. 1 is a perspective view of the portable information processor according to a preferred embodiment of the present invention with its cover for a keyboard closed to make the processor flat and thin. FIG. 2 is a side view of a paper feed handle. FIGS. 3(1) and 3(2) are perspective views of the paper feed handle. FIG. 4 is a perspective view of the information processor with the cover opened and an attachment thereto.

Referring to these drawings, the information processor of the present invention comprises a body 1, a keyboard cover 2, an attachment 3, a paper insertion inlet 4, a paper handle 5, a keyboard 6, a display 7, a memory module inlet 8, an eject lever 9, a memory module cover 10, a paper hold button 11, two cover legs 12, and a lock release lever 26.

The keyboard cover 2 is pivotably moved to expose and hide the keyboard 6. The attachment 3 is a modem or a subkeyboard attached to the rear side of the keyboard cover 2. The attachment 3 is automatically locked when it is inserted into a receptacle (not shown) in the outer surface of the keyboard cover 2. The lock release lever 26 is actuated to release the attachment from the receptacle of the keyboard cover 2. A paper may be inserted into the information processor to print out output data. Preferably, the paper should be of roll-type, so that the paper roll is attached to the information processor at the rear rectangular side adjacent to the paper inlet 4 of the processor. A sheet of the paper is inserted into the paper inlet 4 toward the inside of the information processor. The paper sheet is held by the control of the paper hold button 11. The paper feed handle 5 is manually rotated to rotate a paper feed roller 24 inside the processor. The knob of the paper feed handle 5 can be pulled out from the surface of the processor when it is to be operated. When it is not to be operated, it can be returned into the inside of the surface of the processor.

Referring to FIGS. 2, 3(1) and 3(2), the paper feed handle 5 is concentric and slidably coupled outside a boss of a rotatable shaft of the paper feed roller 24. A pin 23' projecting from boss 22 is engaged within a rectangular groove in a smaller shaft of the handle 5, so that the pulling-in and -out of the handle 5 is stopped. As FIG. 2 shows, the smaller shaft of handle 5 is provided with two apertures with either of which a ball on the smaller shaft is engaged. The ball 23 can be freely moved in and out of the surface of boss 22. Thus, a click mechanism is provided.

Referring now to FIG. 4, the keyboard 6 is somewhat sloped toward the front side. The display 7 is disposed on the inner side of the keyboard cover 2. The display 7 may, for example, be a dot matrix liquid crystal display with the character display capability of 80 digits × 8 lines. The shape of a circuit board of the display 7 is similar to the shape of the display panel. The circuit board of the liquid crystal display is electrically coupled via the inside of the keyboard cover legs 12. Preferably, a flexible cable may be provided for electrically connecting the circuit of the display and a control circuit of the inside of the body 1 in order to serially transfer display information or display control information together with a power. The flexible cable may have about 6 electric lines for this purpose.

Inside each of the keyboard cover legs 12, some gears and air damper are incorporated. During the opening and the closing of the keyboard cover 2, the gears and the damper are operated for smoothly and gradually opening and closing the keyboard cover 2. In particular, during the closing of the keyboard cover 2, the damper prevents the keyboard cover 2 from colliding with the upper cabinet of the body 1, so that the cabinet and the keyboard cover 2 as well as the display 7 are protected. During the opening of the keyboard cover 2, the rear of each of the cover legs 12 comes into contact with the rear cabinet of the body 1 to incline the keyboard cover 2 at the display 7 with a certain angle. Otherwise, the damper of each of the cover legs 12 is operated for holding the keyboard cover 2 at a certain angle before the rear of each cover leg 12 comes into contact with the cabinet. The inclined angle of the keyboard cover 2 is selected such that the contents of the display 7 can be easily read by the operator. The inclined angle of the keyboard cover 2 with the display 7 can be changed with the help of the damper and the gears.

As FIG. 4 shows, a pair of lock parts 27-1 and 27-2 are provided for locking and releasing the keyboard cover 2. The lock part 27-1 is provided on the cabinet of the body 1. The lock part 27-2 is provided on the keyboard cover 2. In accordance with the closing of the keyboard cover 2, the lock parts 27-1 and 27-2 are automatically locked. The lock of the lock parts can be released by a release means (not shown).

The memory module inlet 8 is provided for enabling a memory module to be accommodated. The memory module is a magnetic bubble memory, a floppy disc memory, or the like. When the memory module is inserted into a receptable via the memory module inlet 8, the memory module is locked in place. The eject lever 9 is operated for releasing the lock of the memory module, so that the memory module projects from the inlet 8. A memory module cover 10 is provided.

A magnetic bubble memory is utilized because the contents of the memory can be stored without any power back-up. The memory module is connected to the information processor as an external memory module for storing programs, saving and loading data files.

As FIG. 4 shows, the attachment 3 mounted on the rear side of the keyboard cover 2 is a modem 3-1 for transmitting and receiving data directly via a telephone line without any aid of any acoustic coupler. The modem 3-1 is electrically connected to the information processor via a curled code cable.

In the modem 3-1, there is provided a mode selection switch and a volume controller 13, a speaker 14, a microphone 15, and definition keys 16. Each of the definition keys 16 is operated for specifying and recording the telephone number of the other party so that each definition key 16 is operated for directly calling the other party without inputting a subkeyboard 18. A handset 17 is connected to the modem 3-1 via a code cable. In place of the speaker 14 and microphone 15, the handset 17 may be used for speaking and listening during a call. The subkeyboard 18 includes "0" to "9" digits keys and data entry keys, so that the subkeyboard 18 can be operated as a subkeyboard of the keyboard 6 of the body 1 and an input keyboard of a telephone number.

FIG. 5 is a perspective view of another attachment to the information processor in another preferred embodiment of the present invention. Referring to FIG. 5, the another attachment is a Japanese word processor keyboard 3-2. The keyboard 3-2 comprises a key input unit 19, a definition key unit 20, and a touch pen 21.

The key input unit 19 includes a plurality of keys for Japanese alphabets, English alphabets, and figures, a cursor shift key, and a key pad actuated for converting Japanese alphabets into Chinese characters. The definition key unit 20 includes a plurality of keys each actuated for directly inputting some selected proper nouns and frequently used words without inputting the alphabet keys. The touch pen 21 is provided for touching each key pad for inputting. The touch pen 21 may be chained to thereby prevent it from being lost.

As FIG. 1 shows, the information processor is made flat and thin when the keyboard cover 2 hides the keyboard 6, so that it can easily be hand carried. With the help of the keyboard cover 2, the keyboard 6 and display 7 can be shielded from the outside. This is preferable when it is being carried. In operation, the sloped keyboard 6 and the inclined display 7 appear, so that they can be effectively operated.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An electronic apparatus comprising:
   a body having a front portion, a rear portion, an upper face and sidewalls extending from said front portion to said rear portion for defining a housing therebetween, a socket is provided in one sidewall and is positioned adjacent to said rear portion;
   a keyboard located on the upper face of said body and being positioned adjacent to said front portion of said body;
   a cover, having an inner face and leg members, said leg members being pivotably mounted on said sidewalls of said body for covering and protecting said keyboard when said cover is in a closed position;
   a display located on the inner face of said cover;
   a paper feed device having a retractable rotatable paper feed handle positioned within the socket of said body during a nonoperational mode and extendable from said socket and manually manipulated for paper feeding during an operational mode;
   said paper feed device comprises:
   a paper feeding roller having two ends and a roller axis;
   a rod, having two ends, colinear with said paper feeding roller axis with one end operatively connected to and extending from one end of said paper feeding roller;
   a boss operatively attached to the other end of said rod, said boss including a pin extending from said boss and substantially perpendicular to the feeding roller axis, said boss including a hole substantially perpendicular to said feeding roller axis in which a spring and a ball are positioned with said spring biasing said ball from said hole in said boss;

said retractable rotatable paper feed handle including a hollow shaft in which said boss is slidably received, the hollow shaft including a groove into which said pin of said boss is received constituting stops for said pin, the hollow shaft including two holes into which alternatively said ball can be biased constituting a click mechanism for substantially retaining said retractable rotatable paper feed handle in either a retracted nonoperational mode or an extended operational mode.

2. The electronic apparatus according to claim 1, including a holding means operatively connected to said cover for retaining said cover in an open position during use of the electronic apparatus, said holding means comprising a gear and a damper.

3. The electronic apparatus according to claim 1, and further including an attachment, said cover includes a receptacle for receiving said attachment.

4. The electronic apparatus according to claim 3, wherein said attachment comprises a modem.

5. The electronic apparatus according to claim 3, wherein said attachment comprises a keyboard for a word processor.

6. The electronic apparatus according to claim 1, wherein said display is a liquid crystal display.

* * * * *